United States Patent [19]

Hofmann et al.

[11] Patent Number: 4,707,130
[45] Date of Patent: Nov. 17, 1987

[54] METHOD AND APPARATUS FOR THE OPTICAL MEASUREMENT OF FLUID FLOW

[75] Inventors: Jörg Hofmann, Munich; Kurt Ding, Augsburg, both of Fed. Rep. of Germany

[73] Assignee: MTU Motoren-und Turbinen-Union Munchen GmbH, Munich, Fed. Rep. of Germany

[21] Appl. No.: 684,605

[22] Filed: Dec. 21, 1984

[30] Foreign Application Priority Data

Dec. 24, 1983 [DE] Fed. Rep. of Germany ....... 3347092

[51] Int. Cl.⁴ .......................... G01P 3/36; G01P 5/22
[52] U.S. Cl. .................................... 356/28; 73/861.06
[58] Field of Search ................ 356/28, 28.5; 73/861.05, 861.06, 861.41, 514

[56] References Cited

U.S. PATENT DOCUMENTS

| | | | |
|---|---|---|---|
| 3,320,804 | 5/1967 | Halberstam | 356/28 |
| 3,503,680 | 3/1970 | Schenkerman | 356/5 |
| 3,558,898 | 1/1971 | Block | 356/28 X |
| 3,941,477 | 3/1976 | Schodl | 356/28 |
| 4,201,467 | 5/1980 | Hartmann et al. | 356/28 |
| 4,206,999 | 6/1980 | Keller | 356/28 |
| 4,516,851 | 5/1985 | Parker et al. | 356/28 |

OTHER PUBLICATIONS

J. Sabater, "Vélocimétrie Laser Par Corrélation," *J. Optics* (Paris), 1980, pp. 225–229.

*Primary Examiner*—Stephen C. Buczinski
*Assistant Examiner*—Linda J. Wallace
*Attorney, Agent, or Firm*—Roberts, Spiecens & Cohen

[57] ABSTRACT

Method and apparatus for optical measurement of fluid flow in which particles are injected into the fluid flow to permit accurate velocity measurements to be made thereof between two laser beams through measuring windows and to obtain a velocity profile. One beam is fixed and provides indication of start event, and the other beam is moved in discrete angular steps around the first beam in oscillatory fashion to provide indication of stop events. The sum of the particles passing the start beam and the sum of the particles subsequently passing the stop beam are correlated by electronic evaluation circuitry.

12 Claims, 10 Drawing Figures

METHOD AND APPARATUS FOR THE OPTICAL MEASUREMENT OF FLUID FLOW

FIELD OF THE INVENTION

This invention relates to a method and apparatus for optically measuring the flow of a fluid carrying stray particles, by capturing the transit times of the particles through a test section between two light beams.

The term "stray particles" used herein embraces solid particles or liquid particles in the form of droplets.

DESCRIPTION OF PRIOR ART

Known in the art are two-focus and multi-windowing methods which are used in the investigation of cyclic gas or liquid flows, particularly for determining velocity. Stray particles are added to the flow to facilitate the measurement. The term "cyclic flow" used herein means that flow processes are recurring in a constant cyclic manner.

A particle traversing two light beams produces, by its stray light, a start and a stop pulse, the timed succession of which is a measure of the particle velocity and, hence, of flow velocity.

Inasmuch as the particles have a certain direction and velocity as a timed average only, and inasmuch as not every signal emanates from a single particle having traversed the test section, i.e. the start and stop beams, evaluation of test data is statistical. This produces a distribution curve with a mean particle transit time, on which is superimposed white noise of uncorrelated start-stop events as shown in FIG. 1. In this curve, the maximum frequency of events is clearly seen as a peak.

In comparable conventional measuring systems, the reference quantity determined at each test point is merely the total number of the start events of all measuring windows. In evaluation, therefore, it must necessarily be assumed that the proportional share that a certain measuring window takes in the total rate of events of all windows will remain constant. In actual measurements which have been made, however, it has been found that this assumption is erroneous. The values and distribution of the readings, therefore, are compounded by error when captured. Also, in the presence of pronounced space and time variation of the stray particle rate, the start-stop events captured in individual measuring windows are not sufficient to make the statistical evaluation conclusive.

SUMMARY OF THE INVENTION

An object of the present invention is to provide a method and apparatus for optically measuring cyclic, stray particle-laden fluid flow to enable capture of an accumulation of test signals i.e. correlated events indicative of the number of start events, especially when space and time variation occurs in the particle rate.

It is a particular object of the present invention to provide a method for optically measuring the cyclic flow of a fluid containing stray particles comprising sensing the time the particles spend in transit through a test section between two light beams one of which is a fixed start beam and the other of which rotates in oscillatory fashion in discrete angular steps around said fixed start beam, dividing the flow cycle into a plurality of sections with respective measuring windows, sensing the transit times and distribution of particles at each window by determining the sum of the particles passing the start beam as well as the sum of the particles subsequently passing the stop beam and correlating the events at the start and stop beams to relate the same by electronic evaluation circuitry.

Another particular object of the invention is to provide apparatus for optically measuring the cyclic flow of a fluid containing stray particles comprising means for producing first and second light beams, said first beam being a fixed beam, said second beam rotating in oscillating fashion in discrete angular steps around said fixed beam, a plurality of measuring windows through which said beams pass to illuminate particles in a cyclic fluid flow, means for optically capturing test data by sensing transit time and distribution of the particles in the fluid at each window by the start and stop beams, means for converting the optical signals into electrical signals, and electrical circuit means including counter means and comparators equal in number to said windows and operatively associated therewith for producing output signals when the respective comparators receive signals equal in number to a pre-set minimum. The inventive concept also expressly embraces new potential applications for the apparatus.

A paramount advantage afforded by the present invention is in the capture of space and time variations in the stray particle rate.

A special advantage provided by the apparatus is its potential for use in a simple manner for bladed rotating arrangements.

The apparatus of the present invention also permits an exact investigation to be made of the particle-laden fluid flow not only for velocity, but also for its direction and turbulence. With the present invention, statistical evaluation is made using electronic evaluation circuitry. Referring the frequency of start-stop events to the number of start events may be considered a "standardization" process of the calibration type. This "standardization" is required to balance the inescapable time and space variations in particle velocity. An accumulation of signals referred to the number of start events cannot be determined by simply fixing a test time at each test position.

The invention provides an optical method for investigating the flow of a fluid charged with stray particles, using a twobeam flow tester and a plurality of measuring windows.

The general construction of the electronic evaluation circuitry permits the start events to be counted separately for each window to bring the number of correlated start-stop events, upon completion of a measurement, into relation with the associated number of start events. This provides the advantage that the measurement is safely completed only when the required minimum number of start events has occurred in each window, this being the means for making measurements comparable that were taken at various angular positions.

The electronic evaluation circuitry of the present invention, therefore, enables the termination of the measurement to be defined and a separate start event count to be made.

BRIEF DESCRIPTION OF THE FIGURES OF THE DRAWING

The present invention is described in respect of various embodiments illustrated in schematic arrangement in the attached drawings.

DESCRIPTION OF PREFERRED EMBODIMENTS

Figure 1:
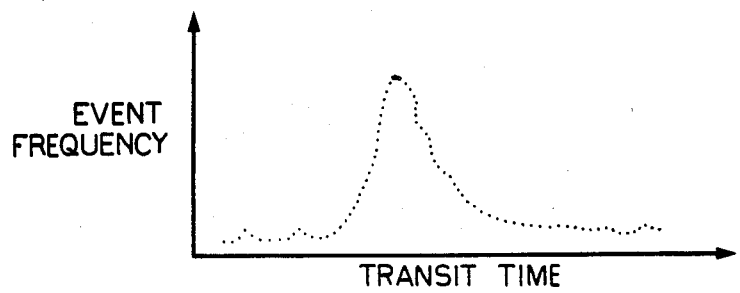
FIG. 1 is a graphical illustration of event frequency i.e. particles passing a light beam with respect to transit time.

Plotted in FIG. 1 is a graph showing event frequency versus transit time.

Figure 2:
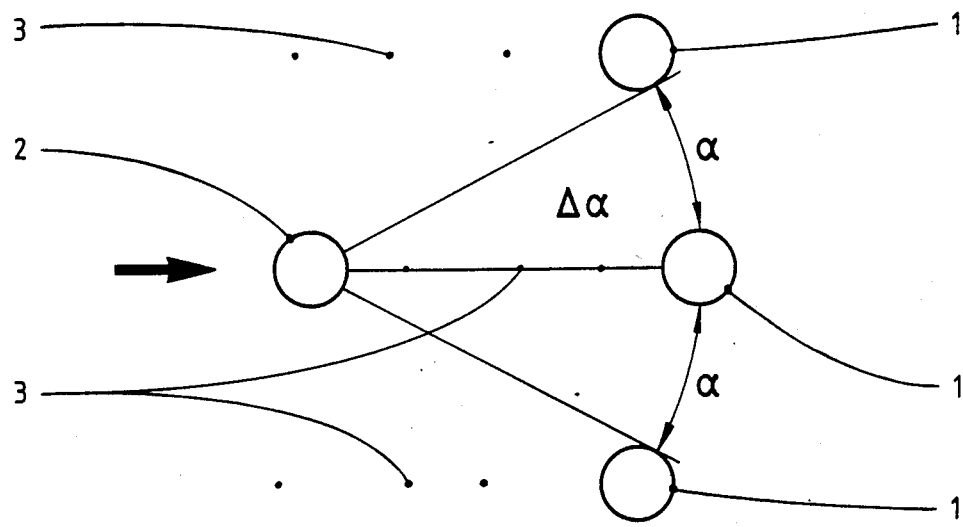
FIG. 2 diagrammatically illustrates defined angular steps of movement of a stop beam about a start beam.
Figure 3:
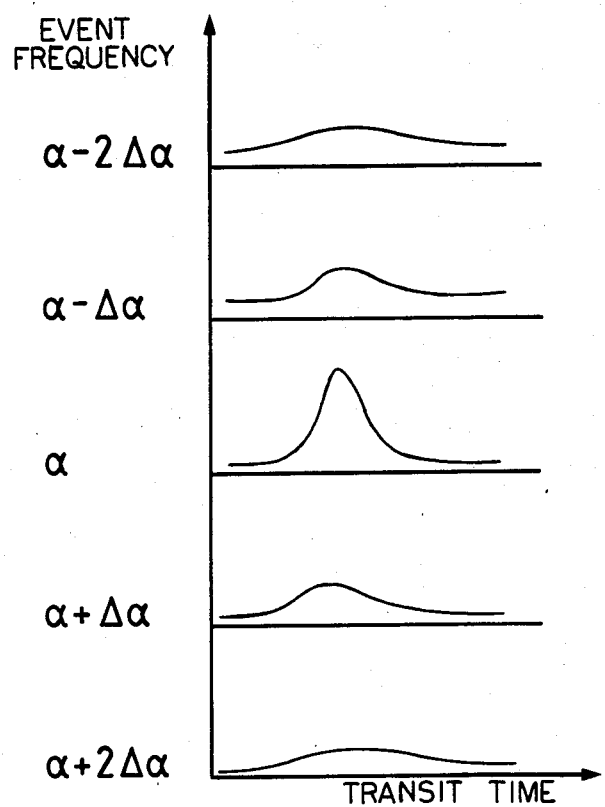
FIG. 3 is a graph which shows event frequency distribution with respect to transit times at certain angular positions.

Referring to FIG. 2, therein according to the invention, a stop beam 1 is moved in discrete angular steps about a central start beam 2 in oscillatory fashion. In this manner, frequency distribution curves versus transit time can be obtained at respective angular positions as shown in FIG. 3 and the presence or absence of accumulations (noise) is readily recognized.

This permits the direction of flow to be determined. The start and stop beams will be aligned in the direction of main flow if a certain number of start pulses is associated with the maximum number of correlated start-stop pulses. It is only then that the majority of the particles having passed the start beam, will subsequently also traverse the stop beam to trigger the respective events. The particles are identified by the numeral 3.

Figure 4:
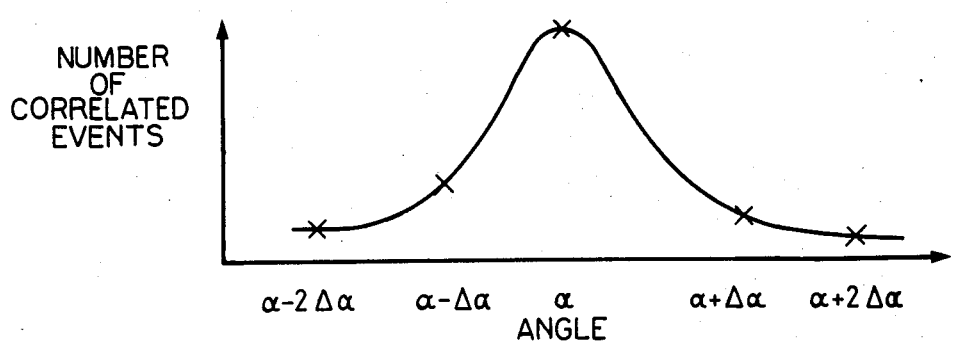
FIG. 4 is a graph which shows the integration of transit time distributions from FIG. 3.

Counters are used to determine the accumulated number of start events. The correlated start-stop events are obtained by summation of the event distribution and are brought into relation or standardized with respect to the start events. This gives, as a function of the respective angular position, a distribution whose peak value indicates the mean flow angle as shown in FIG. 4. Turbulence can be detected, for example, by evaluating the width of the frequency distribution as in FIG. 3.

A preferred use of the present invention is for rotating structures, such as the blades 4 of rotors 5 of compressors or turbines. The invention is also suitable for piston engines or pumps having rotating or reciprocating components.

Figure 5:
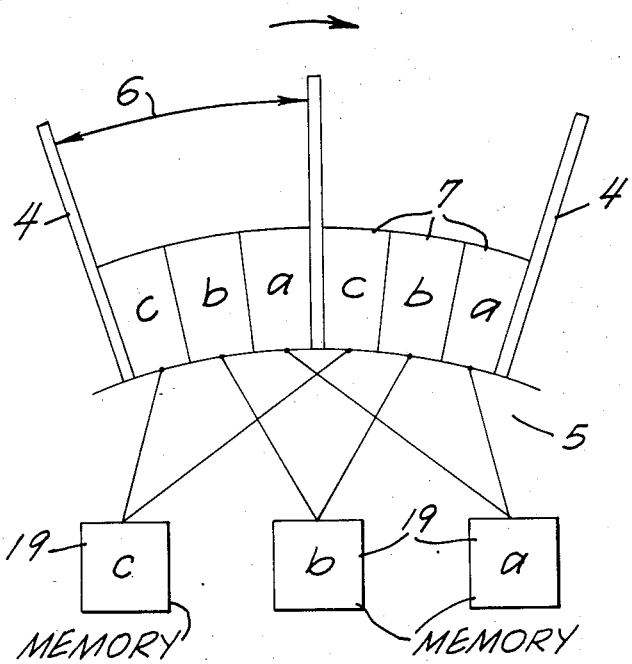
FIG. 5 diagrammatically illustrates apparatus of the present invention for a bladed rotor.

As will become apparent from FIG. 5, in which the direction of rotation is clockwise as shown by the arrow, each blade duct 6 laterally confined by adjacent blades 4 is provided with a number of measuring windows 7, for example three windows a, b and c, and data memories 19 associated with measuring devices at the windows to be described in detail later.

Figure 6:
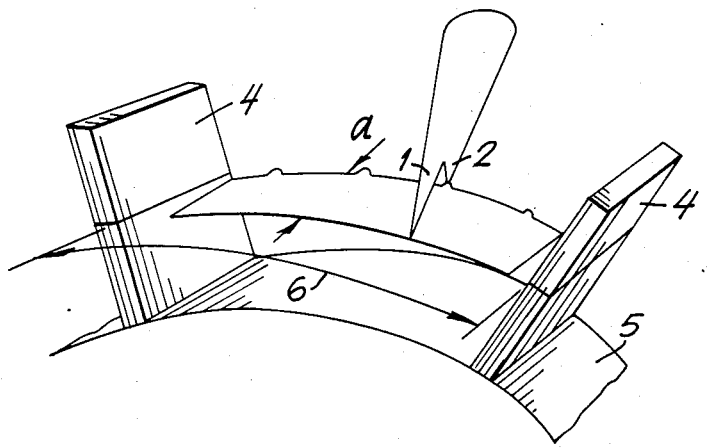
FIG. 6 diagrammatically illustrates, in perspective, a light path viewed in the radial direction of the rotor.
Figure 7:
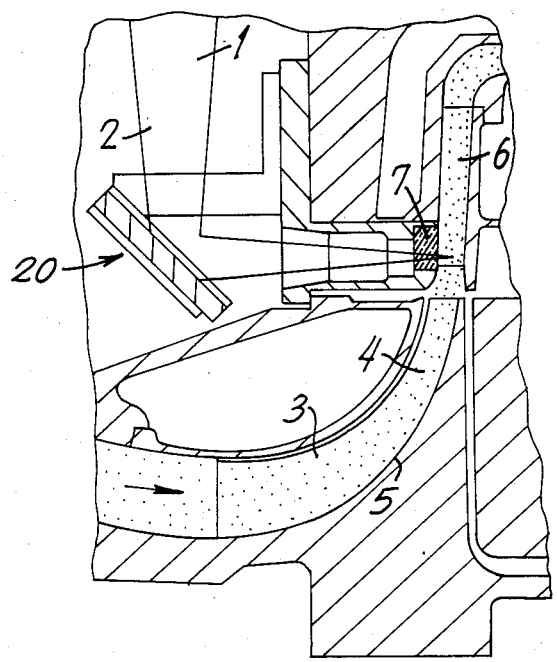
FIG. 7 diagrammatically illustrates a light path in longitudinal sectional view of a radial-flow compressor.

The relative arrangement of the light beams 1, 2 of the two-beam flow analyzer (optical test head) with the blade duct 6 of an axial-flow turbomachine using windows 7 is illustrated in FIGS. 6 and 7, the latter of which shows an embodiment using a radial-flow turbomachine such as a radial-flow compressor, centrifugal pump or turbocharger Associated with a member fixed to duct 6 is a measuring or window 7 through which a flow of particle-laden air is visible.

The beams 1,2 which may be laser beams are deflected by a mirror 20 through the window 7, into the duct 6 where they form the bounds of the intended test section.

Both of the light beams 1, 2 are generated by a gas laser, which in a preferred arrangement, is electronically blocked off by a trigger circuit of electronic control circuitry (not shown) whenever a blade 4 appears in front of the beam exit of the laser. The electronic control circuitry can be replaced with a mechanical-electrical blocking device. The beam is preferably several micrometers in diameter. The distance "a" between beams, representing a test section, can also be made very small, preferably under $10^{-3}$m. Laser beams of this arrangement can detect even the finest of stray particles, such as dust particles. As soon as the particles pass a beam, they trigger a test pulse that is fed, as a start signal, to the input 9 of an electronic evaluation circuit 8 shown in FIG. 8. Transmitted to input 10 through the same input bus is the associated window number. Another input 11 provides the minimum number of events to use as a setting. An output 12 of the electronic evaluation circuit 8 provides a signal to terminate the measurement. An output 13 provides, through an interface 17, the start event counts for input to a computer 18.

The contents of the counters 14 are displayed (FIG. 9) by LED's or LCD's 15 and are compared with the minimum event number from input 11 in comparators 16. An AND gate 12' receives the outputs of the comparators 16 and generates the signal 12 to terminate the measurement.

Reference is made again to FIG. 6 which shows application of the principle of FIG. 2 in an axial flow turbomachine.

The two focussed light beams 1,2 produced by the laser and split in the optical system (see FIG. 10) enter duct 6 axially between two blades 4 and penetrate into the flow of particle laden air therein. The focussed light beams 1, 2 are spaced at their ends by distance "a" and cover an area a $\times$6 as the turbomachine rotates.

The focussed beams have at their measurement points a small volume but high light intensity.

Particles passing through the beams in this area generate two stray light impulses of inverse flow direction (retro stray light) in respective photomultipiers.

From the time lag of the two impulses (start and stop pulses) the velocity of a particle is determined. The velocity has a vector varying in magnitude as well as in direction as a function of time. One can obtain a pair of pulses only if both beams are approximately parallel to the direction of flow of the particle laden air.

For accuracy, thousands of measurements per point are necessary, especially in the case of turbulence.

As evident from the above description, the invention resides in the arrangement of the optical beams 1 and 2 for gathering information from the stray particles in the fluid flow path and in the means which processes the information for providing a measure of the velocity of the fluid flow path. Thus, in conventional arrangements with fixed beams 1 and 2, the optical detection of stray particles in starting and stopping pulses at beams 1 and 2 leads to the production of results concerning the velocity of the particles and hence of the fluid flow. Essentially, with beams 1 and 2 fixed at spaced distances, beam 1 illuminates particles to give start pulses whereas beam 2 illuminates particles to give stop pulses leading to the production of a profile as given in FIG. 1 in which the maximum frequency of events with respect to time provides a measure of the velocity of the fluid flow. The invention provides the moving beam 1 which scans the fluid path as shown in FIGS. 6 and 7 to provide signal outputs as shown in FIG. 3 which when processed in electrical circuit 8 provide a measure of velocity which effectively eliminates erroneous results due to distance and time variations in the rate of the stray particles. The achievement of the movement of beam 1 around beam 2 as a center can be effected by means well known to those skilled in the art such as rotating optical elements or the like.

Figure 8:
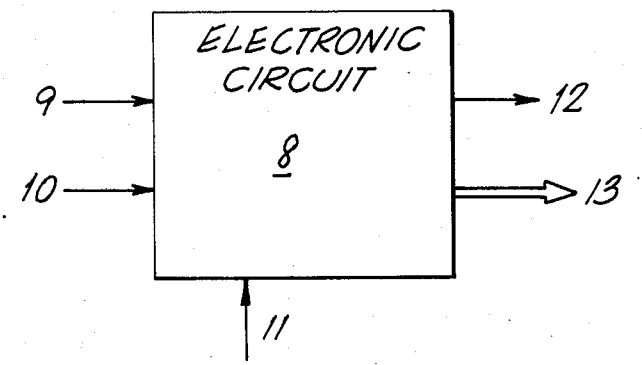
FIG. 8 schematically illustrates electronic evaluation circuitry and its various inputs and outputs.
Figure 9:
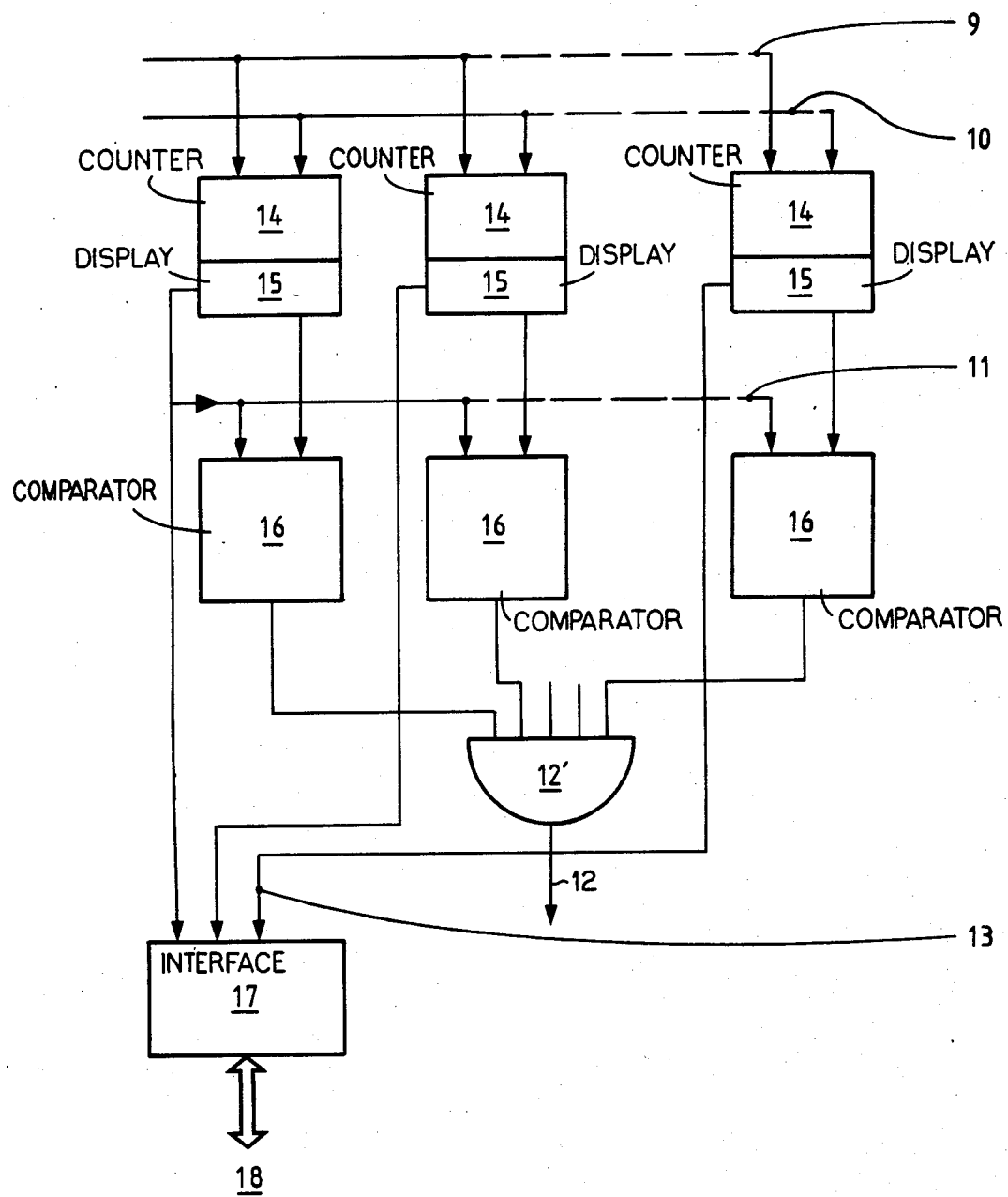
FIG. 9 is a block diagram illustrating the electronic evaluation circuitry.
Figure 10:
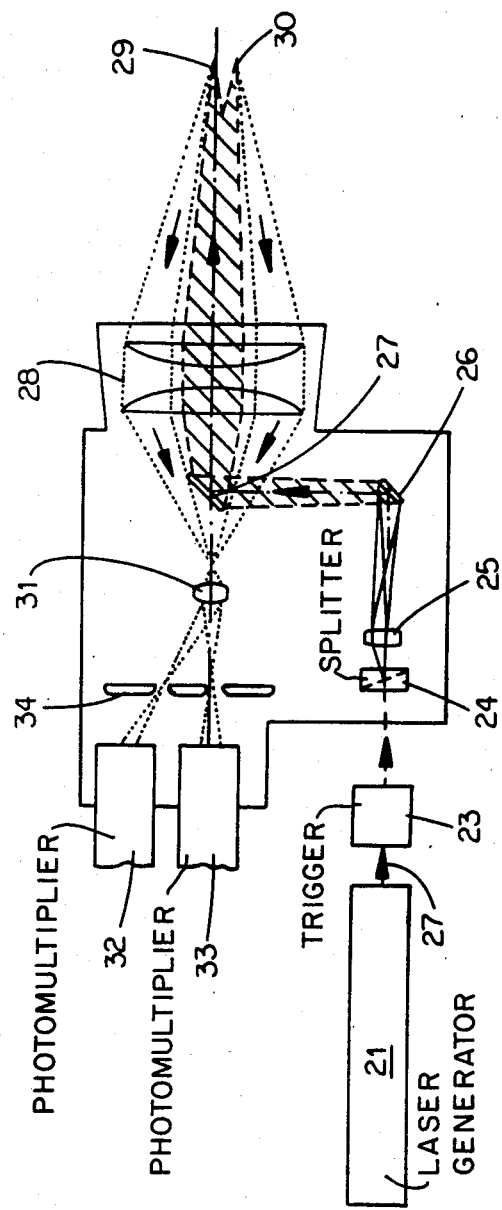
FIG. 10 digrammatically illustrates an optical test head according to the invention.

Referring to FIG. 10, a continous laser 21 produces a beam 22 which passes through a trigger 23 and a splitter 24 splitting the beam into two parallel beams of equal intensity of light focussed by lens 25. The beams then are reflected by two mirrors 26 and 27 and pass through an optical cell 28 having a convex and a concave lens. The two beams are focussed to test points 29 and 30. Stray light is scattered back to the optical cell 28 and from that to a central lens 31. This lens directs beams to photomultipliers 32 and 33. The output thereof is connected to the lines 9 and 10 of the electronic circuit as shown in FIGS. 8 and 9. A shutter is shown at 34.

It is apparent that modifications other than those described herein may be made to the embodiments without departing from the inventive concept. It is contemplated that the inventive concept also embraces all combinations and subcombinations of the features described and illustrated as included in the attached claims.

We claim:

1. A method for optically measuring the cyclic flow of a fluid containing stray particles comprising sensing the time the particles spend in transit through a test section between two light beams one of which is a fixed start beam and the other of which is a stop beam which rotates in oscillatory fashion in discrete angular steps around said fixed start beam as a center, dividing the flow cycle into a plurality of sections with respective measuring windows through which respective start and stop beams can pass, sensing the transit times and distribution of particles at each window by determining the sum of the particles passing the start beam as well as the sum of the particles subsequently passing the stop beam, and correlating the determined sums of the particles respectively passing the start and stop beams at each window to relate the same by electronic evaluation circuitry and provide indication of cyclic flow through the test section.

2. A method as claimed in claim 1 wherein the correlating of the determined sums includes relating the frequency of the start and stop determinations to the number of start determinations.

3. Apparatus for optically measuring the cyclic flow of a fluid containing stray particles comprising means for producing first and second light beams, said first beam being a fixed start beam, said second beam being a stop beam rotating in oscillating fashion in discrete angular steps around said fixed beam as a center, a plurality of measuring windows through each of which two respective start and stop beams pass to illuminate particles in a cyclic fluid flow, means for optically measuring test data by sensing transit time and distribution of the particles in the fluid at each window by the respective start and stop beams, means for converting the optical signals into electrical signals, and electtrical circuit means including counter means and comparators equal in number to said windows and operatively associated therewith for producing output signals when the respective comparators receive signals equal in number to a pre-set minimum.

4. Apparatus as claimed in claim 3 wherein said circuit means further comprises indicator means connected to each of said counter means.

5. Apparatus as claimed in claim 3 wherein each of said counter means comprises separate counters to count start events for each window and to provide an output signal to terminate measurements when the pre-set minimum number of start events has been achieved.

6. Apparatus as claimed in claim 3 wherein the cylic flow is produced in a bladed rotating structure.

7. Apparatus as claimed in claim 6 wherein the rotating structure is a turbine or compressor rotor having spaced blades between which said plurality of windows are arranged.

8. Apparatus as claimed in claim 3 wherein said cylic flow is produced in an internal combustion engine.

9. Apparatus as claimed in claim 3 wherein said cylic flow is produced in a centrifugal pump.

10. Apparatus as claimed in claim 3 comprising a plurality of memory means equal to the number of windows connected to said electrical circuit means.

11. A method as claimed in claim 1 wherein the transit times and distribution of the particles at each window is sensed by counting the number of particles respectively passing the start and stop beams at each window, comparing the count of the number of particles at each window with an input minimum event number and terminating the measurement when the number of particles counted at each window reaches said minimum number.

12. Apparatus as claimed in claim 3 wherein said electrical circuit means comprises an AND gate connected to said comparators to generate a termination signal.

* * * * *